United States Patent
Berger et al.

(12) 
(10) Patent No.: US 6,684,063 B2
(45) Date of Patent: *Jan. 27, 2004

(54) INTERGRATED HEARING AID FOR TELECOMMUNICATIONS DEVICES

(75) Inventors: H. Stephen Berger, Georgetown, TX (US); Dillard Gilmore, Austin, TX (US); Joseph D. Fazio, Ringoes, NJ (US); Sunil Chojar, Lebanon, NJ (US)

(73) Assignee: Siemens Information & Communication Networks, Inc., Boca Raton, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 127 days.

(21) Appl. No.: 08/850,537

(22) Filed: May 2, 1997

(65) Prior Publication Data

US 2001/0041602 A1 Nov. 15, 2001

(51) Int. Cl.⁷ .......................... H04B 1/38; H04R 25/00; H04R 1/00
(52) U.S. Cl. ...................... 455/90.1; 455/346; 455/350; 455/557; 381/312; 381/322; 381/385
(58) Field of Search ................................ 381/312, 314, 381/323, 60, 68, 187, 385, 366, 322, 331; 455/41, 575, 90, 557, 283, 266, 275–276, 334, 346, 350, 296; 379/52

(56) References Cited

U.S. PATENT DOCUMENTS

| | | | |
|---|---|---|---|
| 4,471,171 A | * 9/1984 | Kopke et al. | 381/68 |
| 4,622,440 A | * 11/1986 | Slavin | 381/312 |
| 4,689,820 A | * 8/1987 | Kopke et al. | 381/315 |
| 4,764,957 A | * 8/1988 | Angelini et al. | 381/320 |
| 4,947,432 A | * 8/1990 | Topholm | 381/68.2 |
| 5,083,312 A | * 1/1992 | Newton et al. | 381/320 |
| 5,086,464 A | 2/1992 | Groppe | 379/430 |
| 5,197,332 A | 3/1993 | Shennib | 73/585 |
| 5,202,927 A | * 4/1993 | Topholm | 381/312 |
| 5,335,276 A | * 8/1994 | Thompson et al. | 455/558 |
| 5,388,185 A | * 2/1995 | Terry et al. | 381/29 |
| 5,402,493 A | * 3/1995 | Goldstein | 381/60 |
| 5,537,474 A | * 7/1996 | Brown et al. | 455/411 |
| 5,572,593 A | * 11/1996 | Nejime et al. | 381/68 |
| 5,606,620 A | * 2/1997 | Weinfurtner | 381/312 |

(List continued on next page.)

FOREIGN PATENT DOCUMENTS

| | | | |
|---|---|---|---|
| CA | 2019266 | 12/1990 | H04B/1/40 |
| CH | 668-154 A | * 11/1988 | H04R/25/02 |
| DE | 296 08 340 U1 | 9/1996 | H05M/1/00 |
| DE | 296 08 340 U1 | 9/1996 | |
| EP | 0674415 A | * 3/1995 | H04M/1/00 |
| EP | 0 805 562 A2 | 11/1997 | H04B/1/38 |
| WO | 95/06996 | 3/1995 | H04M/11/00 |

OTHER PUBLICATIONS

OSHA Cincinnati Laboratory (now the Cincinnati Technical Center) Cincinnati, Ohio, Field Service Memo: Electromagnetic Radiation and how it Affects your Instruments, Sec. VII, May 20, 1990.

J. Ross Le Strange et al., Interference to Hearing Aids by the Digital Mobile Telephone Sytem, Global System for Mobile Communications: NAL Report No. 131; May, 1995; 117 pgs.

*Primary Examiner*—Duc M. Nguyen (57) ABSTRACT

A system integrates a hearing aid with devices such as wireless telephones, advantageously avoiding radio frequency (RF) interference. In one embodiment, a processor transforms an electrical signal to compensate for a hearing impairment. The function used for signal transformation can be accessed via a processor memory enhancement such as a smart card. A digital-to-analog converter (DAC) converts the transformed signal to an analog signal, which then goes to an amplifier and speaker. In other embodiments, an analog amplifier transforms the electrical signal.

29 Claims, 8 Drawing Sheets

U.S. PATENT DOCUMENTS

| | | | | |
|---|---|---|---|---|
| 5,608,803 A | * | 3/1997 | Magotra et al. | 381/312 |
| 5,710,819 A | | 1/1998 | Topholm et al. | 381/68.2 |
| 5,721,783 A | * | 2/1998 | Anderson | 381/312 |
| 5,727,070 A | * | 3/1998 | Coninx et al. | 381/312 |
| 5,734,976 A | * | 3/1998 | Bartschi et al. | 455/333 |
| 5,751,820 A | * | 5/1998 | Taenzer | 381/312 |
| 5,768,392 A | * | 6/1998 | Graupe | 381/94.3 |
| 5,768,397 A | * | 6/1998 | Fazio | 381/312 |
| 5,796,821 A | * | 8/1998 | Crouch et al. | 379/430 |
| 5,892,836 A | * | 4/1999 | Ishige et al. | 381/316 |
| 5,910,997 A | * | 6/1999 | Ishige et al. | 381/314 |

* cited by examiner

INTERGRATED HEARING AID FOR TELECOMMUNICATIONS DEVICES

TECHNICAL FIELD OF THE INVENTION

The present invention relates to telecommunications and telephonic devices, and more specifically to the use of telecommunications devices by wearers of hearing aids.

BACKGROUND OF THE INVENTION

Millions of Americans suffer from hearing loss. Most commonly, hearing loss is of one of four types. In slope loss, the ability to hear high frequencies is lost while the ability to hear sounds in the low frequencies is retained. In reverse slope loss, the ability to hear low frequencies is lost while the ability to hear sounds in the high frequencies is retained. Less frequently, the hearer loses the ability to hear sounds in all normally audible frequencies. Finally, some people lose the ability to hear in only a small range of frequencies.

Typically, someone who suffers from hearing loss wears a hearing aid. Hearing aids are electroacoustical devices worn to compensate for a hearing impairment by amplifying sound. They include aids placed behind the ear, aids placed in the ear, and aids placed in the external auditory canal. Hearing aids generally consist of a microphone, an amplifier, and a speaker, but are increasingly sophisticated instruments. Many have automatic gain control and digital signal processing; they can often be programmed to remedy a specific pattern of frequency loss specified by a user's prescription. Hearing aids utilize analog or digital circuitry. Most hearing aids in use today are analog.

Programmable hearing aids include amplifiers and filters controlled by an external digital source. Typically, such a hearing aid will include a memory module and a microprocessor to access the memory locations and to control the frequency response.

Gain is a measure of amplification. The acoustic gain of a hearing aid is the difference in dB between the output and the input at a particular frequency. Frequency response specifies hearing aid gain as a function of frequency when the volume control is in the normal operating range. Circuits that automatically change the gain or frequency response in response to changes in the input signal are called automatic signal processing (ASP). In hearing aids, most types of ASP modify only the gain.

Although hearing aids are of particular use in conversations and other face-to-face situations, they are less useful when combined with signals from electronic device, such as a wireless telephone. Feedback, distortion and radio frequency (RF) interference often interfere with a wearer's hearing aid. Some hearing aid wearers report interference from simply walking past a wireless device in use. As the use of wireless communications devices proliferates, this problem is becoming more and more serious.

What is needed is an invention that allows hearing aid wearers to use electronic and telecommunications devices, such as wireless telephones, without interference and while enabling them to compensate for their frequency loss.

SUMMARY OF THE INVENTION

The present invention includes an apparatus and method which allow a hearing aid to be integrated into a sound-producing device. Sound-producing devices compatible with the invention include wireless communications devices such as cellular telephones. In such uses, the hearing aid can be integrated with the earpiece, such as a headset or a handset. A programmable hearing aid can be programmed to compensate for the wearer's specific hearing loss. The mounting of the hearing aid is accomplished so that RF interference in the hearing aid output is avoided compared with conventional systems.

Copending application Ser. No. 08/639,651, incorporated herein by reference, describes an approach to decreasing interference between hearing aids and wireless communications devices. Application Ser. No. 08/639,651 concerns the use of ferrite materials in a flexible matrix to create an RF shadow that effectively avoids interference. This application applies the teachings of that application but also develops new approaches to reducing interference.

DETAILED DESCRIPTION OF THE PREFERRED EMBODIMENTS

Figure 1:
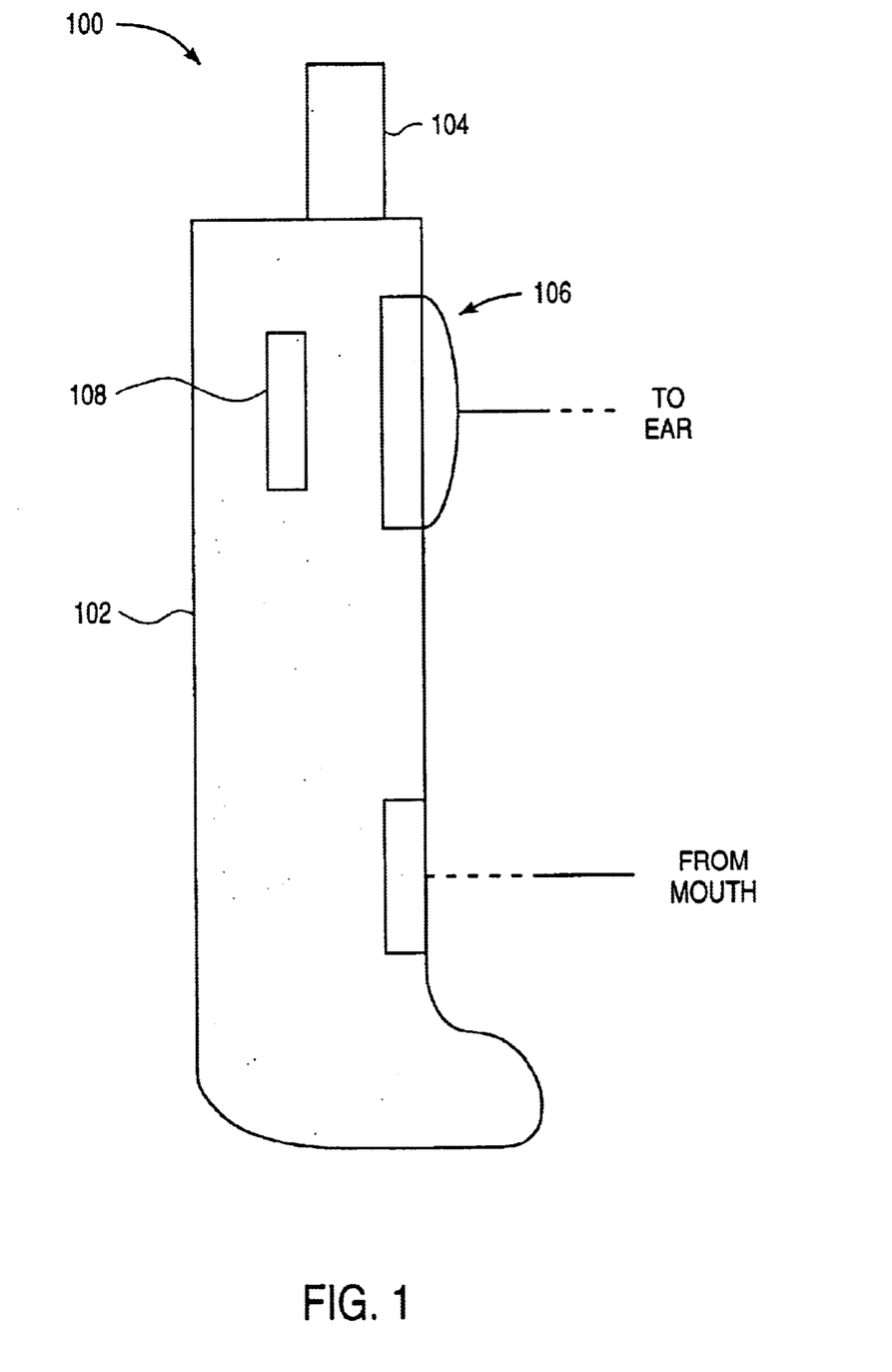
FIG. 1 is a schematic illustration of a handset of a wireless communication system in accordance with the present invention.

An integrated wireless telephone/hearing aid system 100 in accordance with the present invention is schematically illustrated in FIG. 1. In FIG. 1, the user's ear and mouth fit with a handset 102 as indicated in the figure. Wireless handset 102 also includes an antenna 104, an integrated hearing aid device 106, and a smart card bay 108.

Figure 2A:
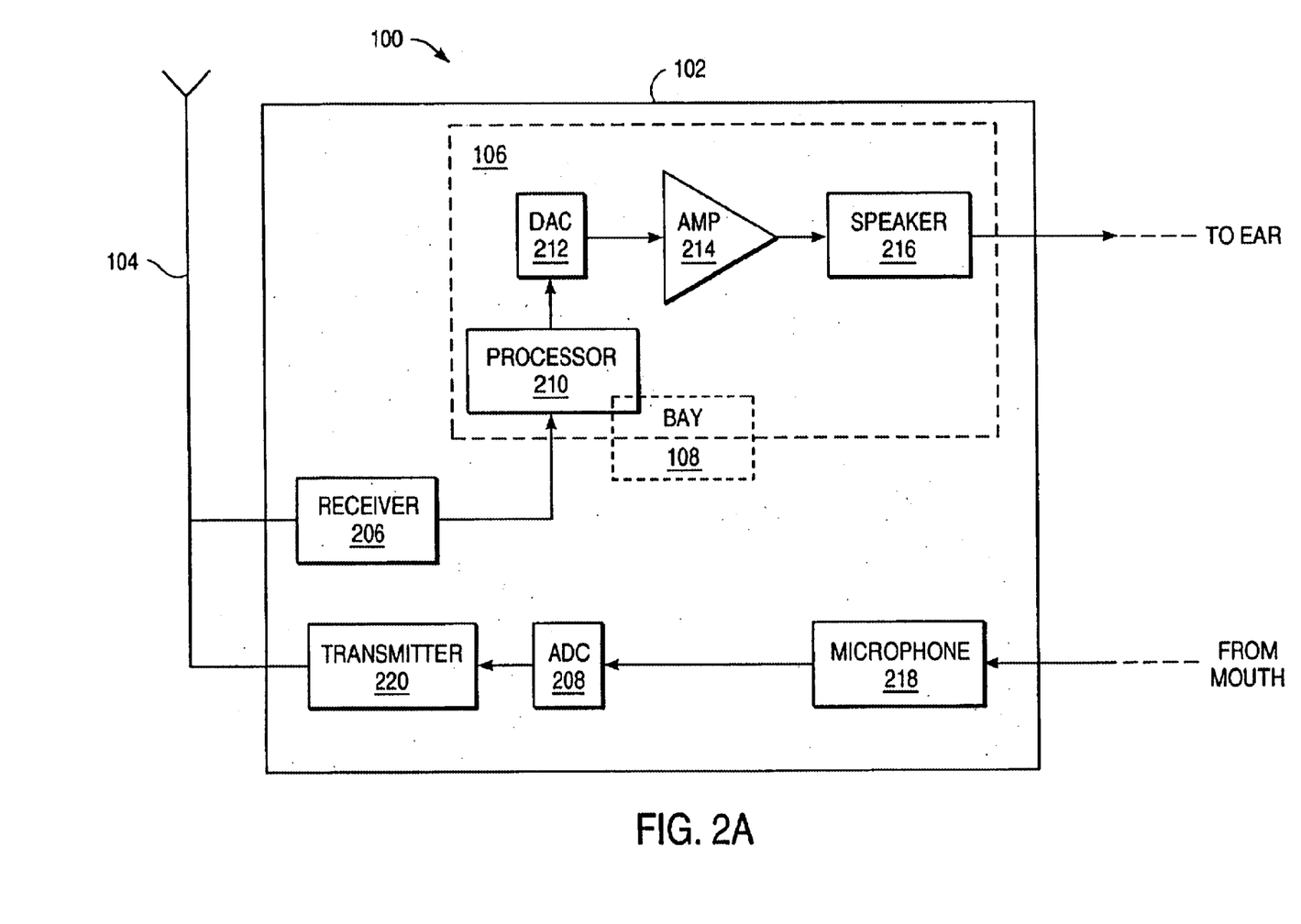
FIGS. 2A and 2B are block diagrams of alternative configurations of the electrical components of the system of FIG. 1.

FIGS. 2A and 2B illustrate alternative configurations of the electrical components of the system of FIG. 1. FIG. 2A shows a digital wireless system. In the system shown in FIG. 2A, a wireless signal is picked up by handset antenna 104 and transmitted to integrated hearing aid device 106. A receiver 206 receives the digital wireless signal picked up by antenna 104 and generates a digital audio signal. The audio signal is then transmitted to a processor 210.

A user's prescription is programmed into processor 210. Processor 210 transforms the signal by applying a transfer function with more gain in the frequency ranges where the user has lost hearing. The digital signal is then transmitted to a digital-to-analog converter (DAC) 212 where it is reconverted to analog. The signal then goes to an amplifier 214, where it is amplified and sent to a speaker 216. From speaker 216, the sound enters the user's ear. In the opposite direction, a microphone 218 picks up sounds and sends them to an analog-to-digital converter (ADC) 208. ADC 208 converts the signal to digital. The signal is then sent to a transmitter 220, which transmits the signal via antenna 104.

Figure 2B:
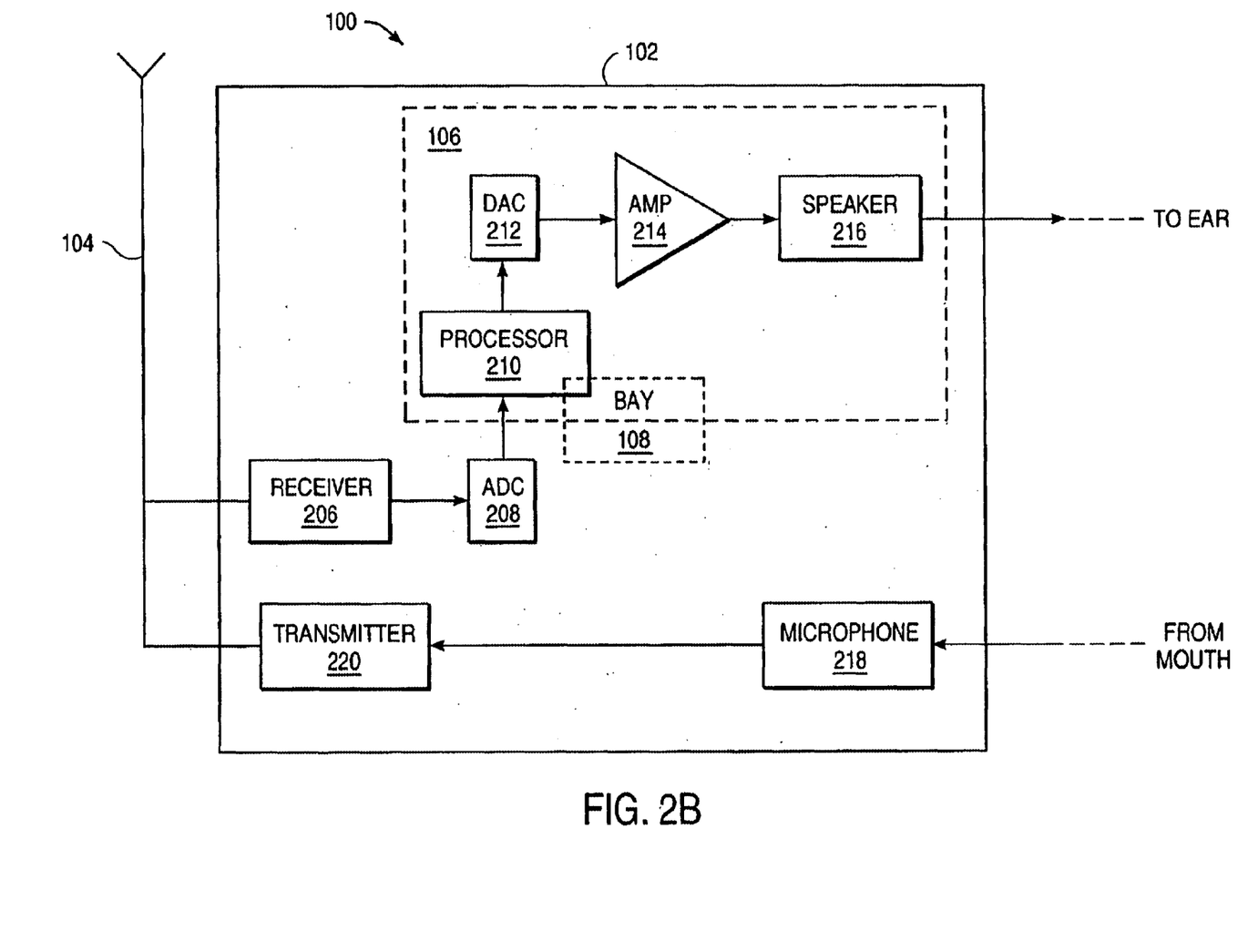

FIG. 2B shows an alternative embodiment including an analog wireless communications device. In the system shown in FIG. 2B, a wireless signal is picked up by handset antenna 104 and transmitted to integrated hearing aid device 106. A receiver 206 receives and demodulates the analog signal picked up by antenna 104 and generates an audio signal. The audio signal is then transmitted to an analog-to-digital converter (ADC) 208. Digital output from ADC 208 is transmitted to a processor 210.

A user's prescription is programmed into processor 210. Processor 210 transforms the signal by applying a transfer function with more gain in the frequency ranges where the user has lost hearing. The digital signal is then transmitted to a digital-to-analog converter (DAC) 212 where it is reconverted to analog. The signal then goes to an amplifier 214, where it is amplified and sent to a speaker 216. From speaker 216, the sound enters the user's ear. In the opposite direction, a microphone 218 picks up sounds and sends them to a transmitter 220, which transmits the signal via antenna 104.

In alternatives, multiple prescriptions can be programmed into processor 210. The multiple prescriptions can allow a single user with hearing loss in both ears to select between prescriptions and thus use either ear. Processor 210 can also be programmed with different prescriptions for different users. There are many ways various users can access different prescriptions. For example, each user can be given a code whose entry will cause implementation of his own prescription. Implementation can be by PBX, in which centralized processors store prescription codes, for example allowing employees to enter codes that tailor signals to their prescription at any company telephone. In other embodiments, switches on the handset can allow users to select their prescription from among programmed prescriptions.

Additionally, the processor is preferably programmable, so that the programming can be changed if a user's prescription changes, or to accommodate users not previously known to the system, e.g. visitors or users of public telephones. For example, the processor is reprogrammed if one user leaves the workplace and another user starts employment.

In a preferred embodiment, a user's prescription can be programmed into a "smart card", a memory card such as a PCMC (personal computer memory card) or SIM (Subscriber Identity Module) card. In this embodiment, the wireless phone is equipped with a memory card bay (sometimes called a "socket" or a "slot") into which such cards fit.

Such cards act as memory modules that connect with a motherboard or the system's expansion bus. Typically, the card plugs into a 68-pin interface that connects the card to the system through an adapter. The adapter allocates resources to the card based on software operating at the level of the BIOS. Smart cards are used for memory enhancements including one-time-programmable (OTP) memory, RAM, FLASH memory and electronically erasable programmable memory (EEPROM).

In a preferred embodiment, the wireless telephone handset includes a processor with a bus with which smart cards connect when they are inserted into the bay. A typical smart card is roughly the length and width of a credit card, but a little thicker. With prescriptions programmed into a smart card; users can easily carry cards about with them and insert them into any compatible wireless telephone or other device. The memory cards can also be used with other electronic devices such as personal computers, laptop computers, and computer games. Practically any consumer device can be equipped with a processor, bus, and memory card bay that allows a memory card to connect with the processor. Alternatively, if a motherboard is present, the memory card can connect with the motherboard.

In FIGS. 2A and 2B, smart card bay 108 is schematically illustrated as overlapping with processor 210 to indicate that a smart card in the bay connects with the processor. A particular advantage to the smart card approach is that a single user could have different smart cards that use different transfer functions based on the environments in which they will be used. For example, the requirements for a cellular telephone in a car, a wireless telephone in a noisy cafe, or a wireless telephone in a quiet place might be quite different. Furthermore, as the technology becomes standardized, users can carry their personal smart cards and will be able to use them in a wide variety of commonly encountered situations, such as public telephones, airplane passenger audio systems, and emergency assistance systems.

In another embodiment, a user's prescription can be programmed into a SIMM (single in-line memory module) and connected to a motherboard. In such an instance, the integrated hearing aid device could be used for a number of different users with different hearing losses, each of whom could attach his own SIMM to customize any compatible device. Users can select between particular prescriptions by means of codes or switches.

In alternatives, digital processing is not used, making the ADC, processor, and DAC unnecessary. The invention encompasses analog systems to assist the hearing impaired, in which an analog signal is transformed by an amplifier according to a frequency response appropriate to the user's specific hearing loss.

Figure 3A:
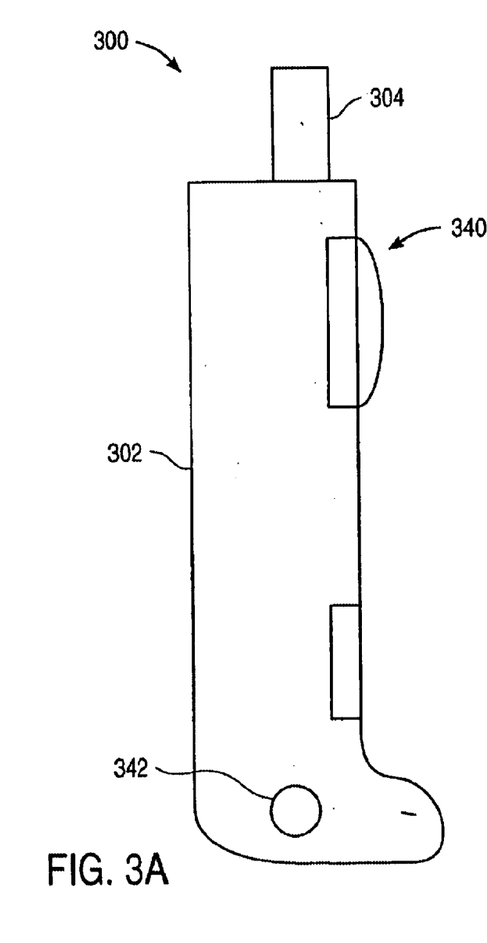
FIGS. 3A and 3B show a wireless handset with a removable standard earpiece; and with a removable earpiece that includes a hearing aid.
Figure 3B:
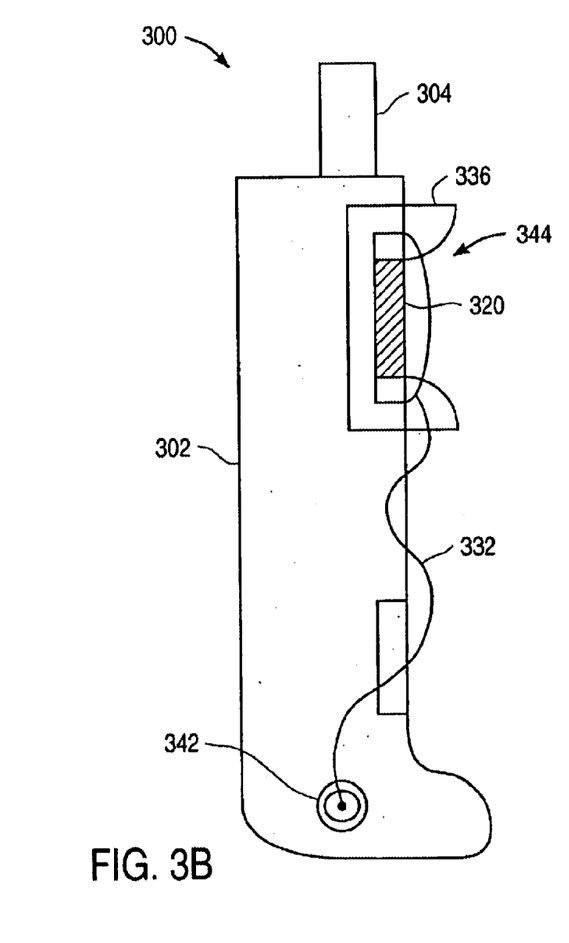

An alternative system in accordance with the present invention is shown in FIGS. 3A and 3B. FIG. 3 illustrates a system in which a wireless telephone system includes removable and replaceable earpieces, so that a handset earpiece for users with hearing loss can replace a standard earpiece. The earpieces can be customized to a particular hearing loss or can be programmable. A wireless telephone/hearing aid system 300 with a removable and replaceable earpiece is shown in FIGS. 3A and 3B. A wireless handset 302 includes an antenna 304, an earpiece 340 or 344, and an audio cable jack 342. FIG. 3A illustrates a handset with a removable earpiece 340. Earpiece 340 is designed for non-hearing-impaired users.

FIG. 3B illustrates the handset of FIG. 3A where earpiece 340 has been replaced by a removable earpiece 344 that includes a hearing aid device. As shown in FIG. 3B, earpiece 344 includes a hearing aid 320, an audio cable 332, and an ear shroud 336 to screen background noise. Audio cable 332 plugs into audio cable jack 342, as shown in FIG. 3B. Ear shroud 336 preferably includes attenuating materials such as ferrites, conductive materials, and/or metallic composites. The attenuating materials can be disposed in a flexible medium such as silicone rubber.

Figure 4:
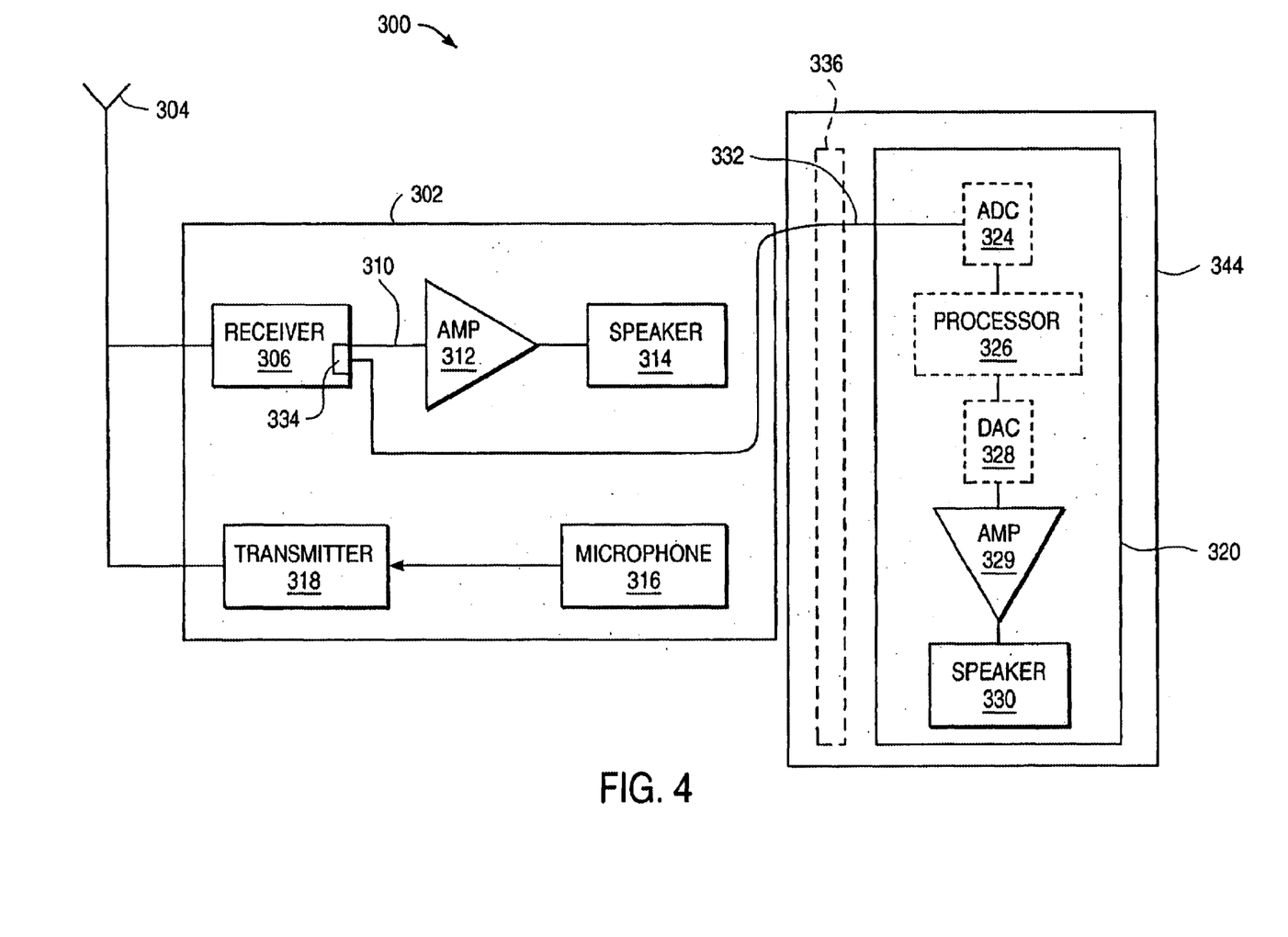
FIG. 4 is a block diagram of the electrical components of the system of FIG. 3B.

FIG. 4 illustrates the electrical components of the system of FIG. 3. In FIG. 4, a wireless telephone handset 302 comprises an antenna 304, a receiver 306, an amplifier 312, a speaker 314, a microphone 316, and a transmitter 318. Removable earpiece 344 includes a hearing aid 320. Hearing aid 320 comprises an analog-to-digital converter (ADC) 324, a processor 326, a digital-to-analog converter (DAC) 328, an amplifier 329, and a speaker 330.

In operation, an audio cable 332 is connected to an output 334 of receiver 306. The analog signal 310 from receiver 306 is input into ADC 324 of hearing aid 320 via audio cable 332. Amplifier 312 and speaker 314 of handset 302 are bypassed. Although the connection is shown through external audio cable 332 plugged into jack 342 (as shown in FIG. 3), the connection can be internal, as for example through pins. The connection can also be by infrared links. In these cases, cable 332 and jack 342 are absent. In preferred embodiments, the signal is intercepted before it has been shaped by the amplifier of the parent device. This typically simplifies the processing of the signal. However, as would be apparent to those skilled in the art, the signal can be intercepted in other places along its pathway.

A layer 336 of attenuating material is located between telephone 302 and hearing aid 320. In the preferred embodiment, the attenuating material is disposed between antenna 304 and hearing aid 320 so as to create an RF shadow between the antenna and the hearing aid.

Processor 326 transforms the signal to compensate for the user's particular hearing loss. For example, if the user has a slope loss (i.e., can hear low frequencies but progressively loses high frequencies), the processor boosts the high frequencies. Conversely, if the user has a reverse slope loss (i.e., can hear high frequencies but not low), the processor boosts the low frequencies.

In an alternative, replacement earpiece 344 includes an analog hearing aid. In this embodiment, ADC 324, processor 326, and DAC 328 are omitted, and audio cable 332 connects directly to amplifier 329. Amplifier 329 amplifies the signal from receiver 306 with a certain frequency response, depending on the particular hearing impairment to be compensated for. In an alternative, the standard earpiece includes the amplifier and speaker for the handset, so that the handset amplifier and speaker are removed when the standard earpiece is removed.

In alternative embodiments, the processed output can be transmitted to a cochlear implant instead of to a conventional hearing aid. A cochlear implant is a surgical implantation of electrode wires into the cochlea to deliver direct electrical stimulation to the sensory cells of the cochlea, which in turn stimulate the auditory nerve. The opposite end of the wire is typically attached to a receiver embedded in the mastoid bone; the wire typically exits through the skin behind the ear. The electrode wire in a typical cochlear implant connects to a signal or speech processing box; a microphone worn behind the ear picks up sound and transmits it to the processing box. The processing box selects, amplifies, digitizes, filters, and/or codes the sound and transmits the sound signal to a transmitter coil also behind the ear. The codes are then sent to the implanted receiver, which converts the codes to electrical impulses that are sent to the electrodes.

In one embodiment of the present invention, the signal processing occurs in the processor of embodiments described above, for example, in a handset, wireless communications device, computer, or headphones. The processed signal can be transmitted directly to the implanted receiver or can be sent directly to the implanted electrode wire of a cochlear implant via, for example, a bus or a jack.

In this specification, wireless includes analog cellular, digital cellular, personal communication systems (PCS) and cordless phones, along with other wireless applications such as headsets for televisions, radios, hi-fi sound systems, home entertainment, movie theater seats, auditory loop systems, and other uses. The invention is also compatible with non-wireless telephone handsets and non-wireless speaker systems. As discussed supra, when appropriate, the receiver can be omitted.

Figure 5:
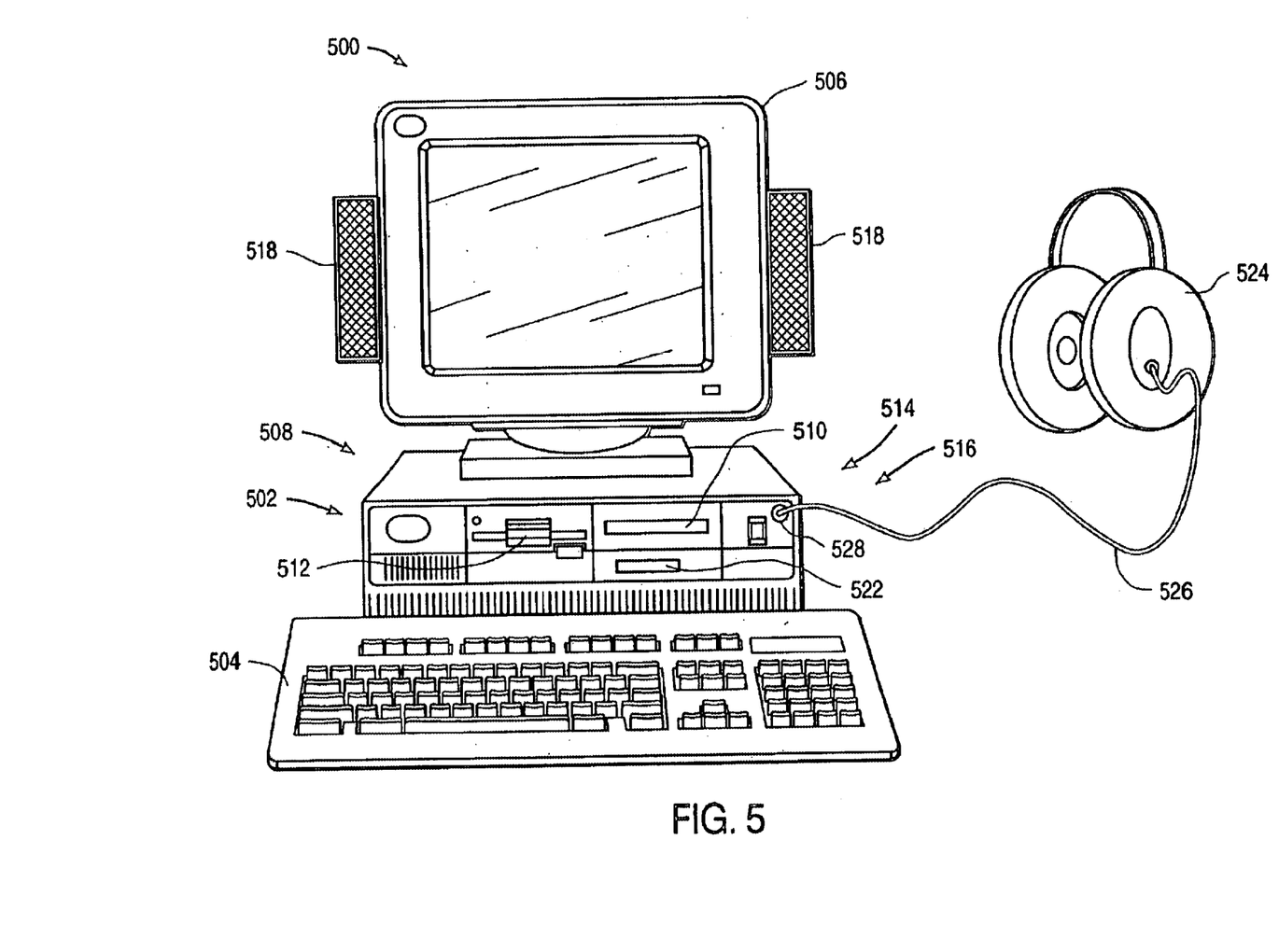
FIG. 5 schematically illustrates a computer system in accordance with the present invention.

FIG. 5 shows a computer system configured in accordance with the present invention. A computer system 500 includes a processor 502, a keyboard 504, a monitor 506, an internal modem 508, a CD ROM bay 510, floppy disk slot 512, internal hard disk storage 514, an amplifier 516, and speakers 518. Processor 502 modifies (according to a transfer function appropriate to the user's hearing impairment) a digital signal that can come from sources including the modem, the CD ROM, or storage on disk. The signal is sent first to a DAC and then to speakers 518. As discussed supra, where appropriate, smart cards can be inserted into a smart card bay 522. Alternatively (or additionally), the transformed signal can be sent to earphones 524 via a cable 526 attached to an audio jack 528 of system 500. If both earphones and speakers are used, the system can be used simultaneously by hearing-impaired and non-hearing-impaired users. Although computer system 500 is illustrated by a PC system, those skilled in the art would be aware that the invention is equally compatible with other computer systems, including laptop or palmtop devices, or computer networks. In a computer network, signal processing can occur away from the user's terminal.

Figure 6:
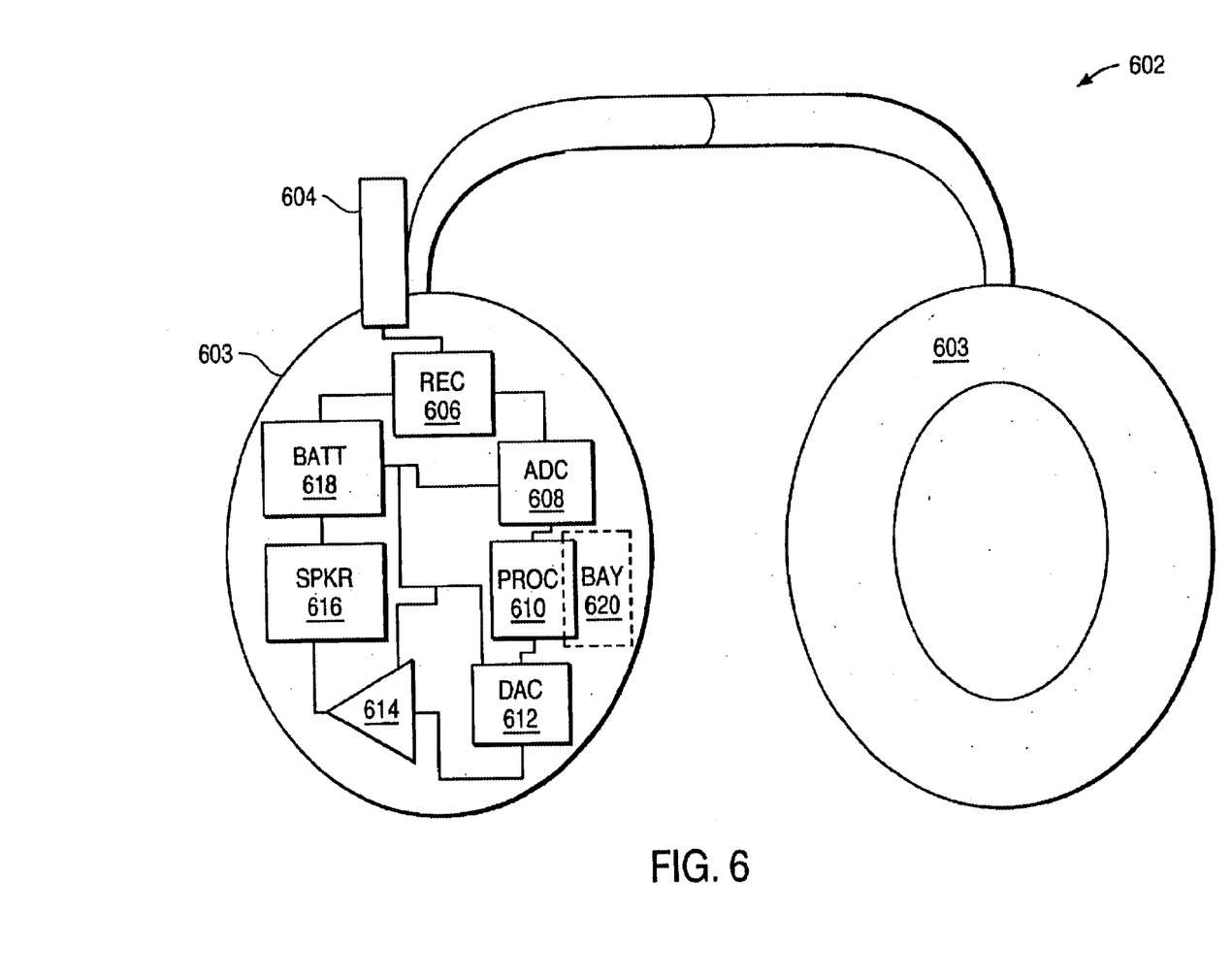
FIG. 6 schematically illustrates headphones for use in systems of the present invention.

In alternative embodiments, a hearing aid component can be integrated into a headset, handset, or speaker. In an embodiment depicted in FIG. 6, a wireless headset 602 includes earcups 603 that fit over a user's ears, an antenna 604, a receiver 606, an ADC 608, a processor 610, a DAC 612, an amplifier 614, and a speaker 616. Wireless headset 602 can be designed to be used with electronic devices including a television set, a computer system, or audio systems including home entertainment systems, radios, tapes, and compact discs. In a preferred embodiment, the power is supplied by a battery 618. An optional smart card bay 620 allows insertion of a smart card.

In alternative embodiments, instead of being "wireless", an earphone or a headset can be plugged into a jack in the device. In such a case, the connection can include an audio cable and an AC cord to power the earphone or headset. As discussed supra, an earphone can be dedicated to a particular prescription; each ear can be programmed to a separate prescription; multiple prescriptions for each ear can be programmed to enable different users to access the proper prescription; or the use of transformed and non-transformed signals can allow simultaneous use by hearing-impaired and non-hearing-impaired users.

In embodiments in which the hearing aid component is in a headset or handset or other speaker component, interference can be significantly decreased by the design of the handset or headset. Because the integrated hearing aid is not constrained by the very small size of typical hearing aids, hearing aid wires and the handset wires can be set in cross-orientation from each other, thereby lessening interference. In addition, greater use can be made of filtering and shielding materials, and sensitive circuits can be placed in low-electromagnetic-noise areas of the handset or device.

The invention can be implemented by software. The invention comprises signal processing by transfer functions, and as is well known in the art, linear transfer functions can be implemented by software using input-output difference equations. Taking an input of amplitude values, the output at time i is a weighted combination of the input at i and several previous inputs. The coefficients depend on the transfer function.

Figure 7:
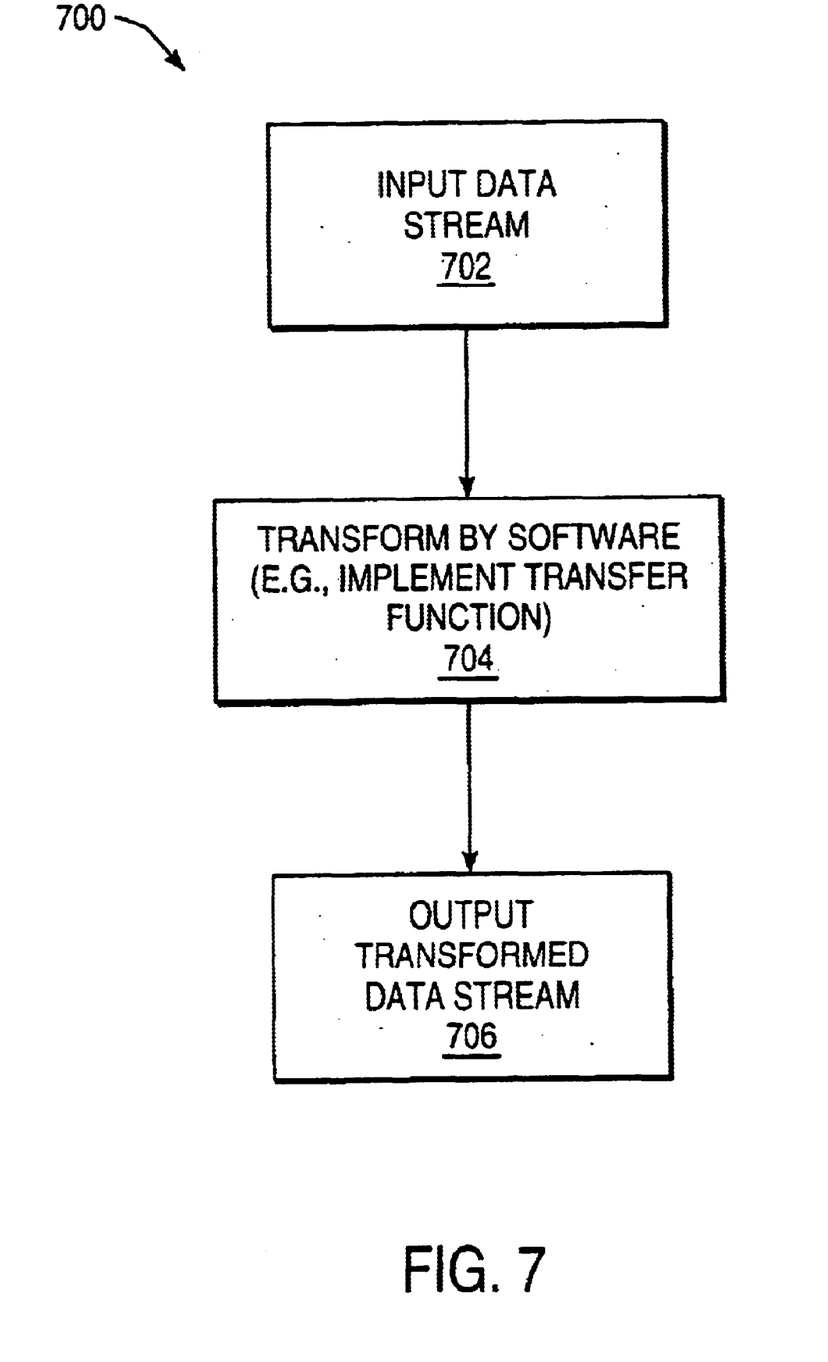
FIG. 7 is a flow chart illustrating software implementation of the present invention.

A flow chart schematically illustrating a method 700 implemented by the software is shown at FIG. 7. A data stream is input at a step 702. The data stream includes signal amplitude values at a sequence of times. The data stream is transformed by the software, at a step 704. The transformation can be, for example, implementation of a transfer function characterizing the user's hearing aid prescription. Alternatively, the transformation could be a non-linear, time-variable, or adaptive filter. At a step 706, the transformed data stream is output at each time i as a weighted combination of several previous inputs.

Although much of the discussion has concerned linear transfer functions, the invention is also compatible with nonlinear systems. For example, an adaptive "anti-noise" capability can be used to effect hearing improvement. In alternatives, digital processing is not used. The invention encompasses analog devices, in which an analog signal is amplified across a certain frequency range. In wireless uses, a receiver is often necessary because the incoming signal must be demodulated. However, in other systems, a receiver may not be needed and the signal can be directly presented to the ADC or amplifier. The invention is also compatible with ISDN (Integrated Services Digital Network) or GSM (Global System Mobile) communications devices. Those skilled in the art will recognize other variations, modifications, and adaptations of the present invention, the scope of which is limited only by the following claims.

What is claimed is:

1. A system for compensating for hearing impairment comprising:
   an electronic device for producing sound in response to an electrical signal; and
   a hearing aid device for compensating for a uses's hearing impairment profile including a processor and a first and a second removable and replaceable storage means, said hearing aid device electrically connected to said electronic device and intercepting the electrical signal, said processor transforming the electrical signal according to the hearing impairment profile and passing the transformed electrical signal to the electronic device, said first removable and replaceable storage means storing a first function according to which said electrical signal is transformed and said second removable and replaceable storage means storing a second function according to which said electrical signal is transformed,
   wherein one of said storage means is implemented in a first handset earpiece that physically replaces a second handset earpiece on a telephone handset, said first handset earpiece during use being held next to a caller's face by said telephone handset.

2. A wireless telephone system comprising:
   a wireless telephone receiver that receives and transmits an electrical signal;
   a hearing aid device including a processor, said hearing aid device electrically connected to said receiver and receiving said electrical signal from said receiver, said processor receiving and transforming said electrical signal according to a hearing impairment profile, the hearing impairment profile being pre-stored on a removable and replaceable memory coupled to the hearing aid device, whereby the memory is interchangeable by a user for selecting an alternative hearing impairment profile for use by a different user or for use in a different environment; and
   a speaker located in a wireless telephone in said system, said speaker outputting said transformed signal as sound;
   wherein said removable and replaceable memory is implemented within a first handset earpiece that physically replaces a second handset earpiece in said wireless telephone.

3. A system as described in claim 1 or claim 2, wherein said electrical signal is transformed to compensate for a slope hearing impairment.

4. A system as described in claim 1 or claim 2, wherein said electrical signal is transformed to compensate for a reverse-slope hearing impairment.

5. A system as described in claim 1 or claim 2, wherein said electrical signal is transformed to compensate for the particular hearing impairment of an individual person.

6. The system of claim 1 or 2 wherein said hearing aid transforms said signal according to a transfer function.

7. The system of claim 1 or 2 wherein said hearing aid transforms said signal according to a nonlinear function.

8. The system of claim 1 or 2 wherein the electronic signal is sent to an analog-to-digital converter, then to the processor, and then to a digital-to-analog converter.

9. The system of claim 1 or 2 in which the hearing aid device is powered by alternating current.

10. The system of claim 1 or 2 in which the hearing aid device is powered by a battery.

11. A system as described in claim 1 wherein said electronic device and said hearing aid are housed within a single housing.

12. A system as described in claim 1 wherein said storage means is incorporated in a removable, replaceable module.

13. The system of claim 12 wherein said removable storage means is a Subscriber Identity Module (SIM) card.

14. The system of claim 1 in which an audio cable connects the hearing aid device with the electronic device for producing sound.

15. The system of claim 1 in which the electronic device is a computer system.

16. The removable and replaceable storage means of claims 1, wherein the storage means is also erasable and reprogrammable.

17. A system as described in claim 2 wherein said hearing aid device is implemented in a removable and replaceable earpiece.

18. The wireless telephone system of claim 2, wherein said first handset earpiece further comprises a ear shroud to attenuate background noise, and said second handset earpiece does not comprises a ear shroud.

19. The wireless telephone system of claim 18, wherein said first handset earpiece further comprises an external audio cable, configured for plugging into an audio cable jack on said wireless telephone, said hearing aid device being electrically connected to said receiver and receiving said electrical signal from said receiver via said external audio cable.

20. A method of compensating for hearing impairment comprising:
    replacing a first handset earpiece of a telephone system with a second handset earpiece;
    inputting an electrical signal into an electronic device that produces sound in response to an input electrical signal;
    intercepting, by a hearing aid device electrically connected to said electronic device, said electrical signal;
    transforming, by means of a function stored in a removable and replaceable memory means and implemented by a processor in said hearing aid device, said electrical signal according to a hearing impairment profile, said removable and replaceable memory means being within said second handset earpiece; and
    outputting, from said hearing aid device, sound according to the transformed electrical signal.

21. The method of claim 20 in which said hearing aid device is included in the electronic device, is removable and replaceable, and incorporates the memory means.

22. The method of claim 20 in which said electronic device is a wireless telephone.

23. The method of claim 20 in which said electronic device is a computer.

24. The method of claim 20 further comprising the step:

accessing, by said processor, a removable memory means for storing a function according to which said electrical signal is transformed.

25. The method of claim 20 wherein said transforming is implemented by software.

26. The removable and replaceable memory means of claim 20, wherein the memory means is also erasable and reprogrammable.

27. The method of claim 20, wherein said function is associated with a first human user, the method further comprising removing and replacing said removable and replaceable memory means by a second user with an alternative memory means having a function associated with said second user.

28. The method of claim 20, wherein said function is not optimal for a listening environment, the method further comprising removing and replacing said removable and replaceable memory means by a user with an alternative memory means having a function that is appropriate for said listening environment.

29. The method of claim 20, wherein said replacing said first handset earpiece of a telephone system with said second handset earpiece comprises plugging an audio cable into an audio cable jack on said telephone system.

* * * * *